(12) United States Patent
Jiang et al.

(10) Patent No.: US 9,816,328 B2
(45) Date of Patent: Nov. 14, 2017

(54) FRICTION WELDED HEAVY WEIGHT DRILL PIPES

(71) Applicant: Smith International, Inc., Houston, TX (US)

(72) Inventors: Wenhui Jiang, Pearland, TX (US); Alan W. Lockstedt, Magnolia, TX (US)

(73) Assignee: SMITH INTERNATIONAL, INC., Houston, TX (US)

( * ) Notice: Subject to any disclaimer, the term of this patent is extended or adjusted under 35 U.S.C. 154(b) by 943 days.

(21) Appl. No.: 14/053,983

(22) Filed: Oct. 15, 2013

(65) Prior Publication Data

US 2014/0103643 A1  Apr. 17, 2014

Related U.S. Application Data

(60) Provisional application No. 61/714,523, filed on Oct. 16, 2012.

(51) Int. Cl.
*B23K 20/12* (2006.01)
*E21B 17/04* (2006.01)
(Continued)

(52) U.S. Cl.
CPC ............ *E21B 17/04* (2013.01); *B23K 20/129* (2013.01); *E21B 17/00* (2013.01);
(Continued)

(58) Field of Classification Search
CPC .......... B23K 20/12–20/1295; B23K 2201/002; B23K 2201/04–2201/125; B23K 2203/02–2203/05
(Continued)

(56) References Cited

U.S. PATENT DOCUMENTS 3,134,169 A * 5/1964 Hollander .............. B23K 20/12
228/114.5
3,269,001 A * 8/1966 Hollander .............. B23K 20/12
228/113
(Continued)

FOREIGN PATENT DOCUMENTS

CA  2271805 A1 * 5/1998  .......... B23K 20/129
CN  1050409 A  4/1991
(Continued)

OTHER PUBLICATIONS

Weldable Materials in Direct / Inertia Friction Welding, pp. 1-19, (no date available).*
(Continued)

*Primary Examiner* — Kiley Stoner

(57) ABSTRACT

A heavy weight drill pipe for use in a downhole tool. The heavy weight drill pipe may include a tool joint made of as first steel alloy selected from the group consisting of AISI 4135, AISI 4137, AISI 4140, AISI 4142, AISI 4145, and AISI 4147. The tool joint may have as radial thickness between about 3.0 cm and about 5.7 cm. The heavy weight drill pipe may also include as pipe made of as second steel alloy selected from the group consisting of AISI 4135, AISI 4137, AISI 4140, AISI 4142, AISI 4145, and AISI 4147. The pipe may have a radial thickness between about 1.6 cm and about 3.3 cm. A weld region may be formed between the tool joint and the pipe. The weld region may be formed by friction welding the tool joint to the pipe.

7 Claims, 2 Drawing Sheets

(51) Int. Cl.
*E21B 17/00* (2006.01)
*B23K 101/04* (2006.01)
*B23K 101/00* (2006.01)
*B23K 103/04* (2006.01)

(52) U.S. Cl.
CPC .... *B23K 2201/002* (2013.01); *B23K 2201/04* (2013.01); *B23K 2203/04* (2013.01)

(58) Field of Classification Search
USPC ..... 228/112.1–114.5, 2.1–2.3, 262.4–262.41; 285/288.1; 148/529
See application file for complete search history.

(56) References Cited

U.S. PATENT DOCUMENTS

| | | | | |
|---|---|---|---|---|
| 3,784,238 | A * | 1/1974 | Chance | E21B 17/16 175/325.1 |
| 3,978,933 | A * | 9/1976 | Olson | E21B 10/46 175/323 |
| 4,181,845 | A * | 1/1980 | Bolton | C21D 9/50 148/508 |
| 4,331,280 | A * | 5/1982 | Terabayashi | B23K 20/129 228/114.5 |
| 4,367,838 | A * | 1/1983 | Yoshida | B23K 20/129 228/114.5 |
| 4,458,404 | A * | 7/1984 | Garrett | B29C 66/1122 228/175 |
| 5,071,053 | A * | 12/1991 | Heijnen | B23K 20/129 228/114.5 |
| 5,919,578 | A * | 7/1999 | Lundell | B23K 20/129 228/114.5 |
| 6,000,482 | A * | 12/1999 | Michalski | E21B 17/042 175/320 |
| 6,012,744 | A * | 1/2000 | Wilson | E21B 17/16 285/288.1 |
| 6,095,266 | A * | 8/2000 | Lundell | B23K 20/129 175/320 |
| 6,378,760 | B1 * | 4/2002 | Shimizu | B23K 20/028 228/193 |
| 6,637,642 | B1 * | 10/2003 | Lingnau | B23K 13/00 219/601 |
| 2008/0138649 | A1 * | 6/2008 | Mataga | B23K 15/0006 428/684 |
| 2008/0302539 | A1 * | 12/2008 | Mallenahalli | B23K 20/1225 166/380 |
| 2009/0134203 | A1 * | 5/2009 | Domec | B23K 20/123 228/112.1 |
| 2009/0211816 | A1 * | 8/2009 | Williams | E21B 17/00 175/328 |
| 2009/0224024 | A1 | 9/2009 | Kawaura et al. | |
| 2010/0044110 | A1 * | 2/2010 | Bangru | C23C 14/0605 175/61 |
| 2010/0047606 | A1 | 2/2010 | Seidinger | |
| 2010/0213245 | A1 * | 8/2010 | Bass | B23K 20/12 228/114 |
| 2010/0285327 | A1 * | 11/2010 | Sutherlin | B01J 19/02 428/586 |
| 2011/0290475 | A1 * | 12/2011 | David | E21B 17/023 166/241.5 |
| 2012/0018219 | A1 * | 1/2012 | Runia | E21B 7/04 175/26 |
| 2012/0211127 | A1 * | 8/2012 | Hisada | C21D 1/18 148/516 |
| 2012/0228034 | A1 | 9/2012 | Roussie et al. | |
| 2013/0180728 | A1 * | 7/2013 | Hugghins | B23K 20/129 166/378 |
| 2013/0313025 | A1 * | 11/2013 | Aung | E21B 17/10 175/325.1 |
| 2014/0041945 | A1 * | 2/2014 | Guelaz | E21B 17/028 175/315 |
| 2014/0262513 | A1 * | 9/2014 | Chau | E21B 17/003 175/40 |
| 2015/0060288 | A1 * | 3/2015 | Sista | C25D 11/028 205/50 |
| 2015/0176341 | A1 * | 6/2015 | Hughes | E21B 17/046 166/65.1 |
| 2016/0305194 | A1 * | 10/2016 | Jiang | C21D 6/00 |

FOREIGN PATENT DOCUMENTS

| | | | | |
|---|---|---|---|---|
| CN | 1215643 | A | | 5/1999 |
| CN | 101649376 | A | | 2/2010 |
| EP | 1166947 | A1 * | 1/2002 | ........... B23K 20/129 |
| GB | 1270206 | A * | 4/1972 | ........... B23K 20/129 |
| GB | 1360221 | A * | 7/1974 | ........... B23K 20/129 |
| GB | 1387815 | A * | 3/1975 | ............... B23K 9/23 |
| JP | 61174335 | A * | 8/1986 | |
| JP | 62151524 | A * | 7/1987 | |
| JP | 63225714 | A * | 9/1988 | |

OTHER PUBLICATIONS

DP-Master Heavy Weight Drill Pipe (Aug. 12, 2011).*
Celik et al., Investigation of the mechanical properties and microstructure of friction welded joints between AISI 4140 and AISI 1050 steels, pp. 970-976.*
International Search Report and Written Opinion for International Patent Application No. PCT/US2013/065160 dated Jan. 27, 2014, 14 pages.

* cited by examiner

FRICTION WELDED HEAVY WEIGHT DRILL PIPES

CROSS-REFERENCE TO RELATED APPLICATIONS

This application claims the benefit of a related U.S. Provisional Patent Application having Ser. No. 61/714,523 filed Oct. 16, 2012, titled "Friction Welded Heavy Weight Drill Pipes," to Jiang et al., the disclosure of which is incorporated by reference herein in its entirety.

BACKGROUND

Drill collars are robust components positioned above a drill bit proximate the lower end portion of a drill string. The stress and vibration that the drill collar is designed to endure are oftentimes transmitted to the "standard" pipes that are positioned above the drill collar. Standard drill pipes, however, are not designed to withstand such stress and vibration. Accordingly, heavy weight drill pipes ("HWDPs") are often used to provide a buffer or transition between the drill collar and standard drill pipes.

HWDPs include at least one joint coupled to a pipe. One conventional method for coupling the joint and the pipe includes friction welding. Before welding, the weld area of the joint is preheated to between about 177° C. and about 427° C., for example, by an induction heater. During the friction welding process, the joint is rotated about its longitudinal axis while the pipe remains stationary. An end portion of the rotating joint is then placed in contact with an end portion of the stationary pipe, and the friction between the joint and the pipe generates heat in excess of about 1040° C. The heat and force enable the joint and the pipe to fuse together at a weld zone/region. Once the joint and the pipe begin to fuse or weld together, the rotating joint is rapidly decelerated to a stationary position, and the weld region between the joint and the pipe is allowed to gradually cool due to the temperature differential between the weld region and the surrounding environment.

After the weld region cools, it is tempered (i.e., re-heated) at between about 500° C. and about 730° C., for example, by the induction heater. The weld region is allowed to gradually cool again due to the temperature differential between the weld region and the surrounding environment. This process is called stress relief treatment.

Alternatively, the weld region may experience quenching and tempering treatment. After the weld region cools, it is re-heated to between about 780° C. and about 1000° C., for example, by the induction heater. The weld region is then quenched with pressurized air, water, brine, oil, or the like for rapid cooling. This step is oftentimes referred to as "active quenching" or "forced quenching." Once the weld region cools, it is tempered at between about 500° C. and about 730° C., for example, by the induction heater. Finally, the weld region is allowed to gradually cool due to the temperature differential between the weld region and the surrounding environment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A heavy weight drill pipe for use in a downhole tool is provided. The heavy weight drill pipe may include a tool joint made of a first steel alloy selected from AISI 4135, AISI 4137, AISI 4140, AISI 4142, AISI 4145, and AISI 4147. The tool joint may have as radial thickness between about 3.0 cm and about 5.7 cm. The heavy weight drill pipe may also include a pipe made of a second steel alloy selected from AISI 4135, AISI 4137, AISI 4140, AISI 4142, AISI 4145, and AISI 4147. The pipe may have a radial thickness between about 1.6 cm and about 3.3 cm. A weld region may be formed between the tool joint and the pipe. The weld region may be formed by friction welding the tool joint to the pipe.

A method for forming a heavy weight drill pipe is also provided. The method may include friction welding a tool joint made of a first steel alloy to a pipe made of a second steel alloy to form a weld region therebetween having a first temperature. The first steel alloy may be selected from AISI 4135, AISI 4137, AISI 4140, AISI 4142 AISI 4145 and AISI 4147, and the second steel alloy may be selected from AISI 4135, AISI 4137, ALSI 4140, AISI 4142, AISI 4145, and AISI 4147. The weld region may be cooled from the first temperature to a second temperature through self quenching. The weld region may then be heated from the second temperature to a third temperature. The weld region may then be cooled from the third temperature to a fourth temperature.

Another method for forming a heavy weight drill pipe is further provided. The method may include rotating a tool joint between about 1,000 RPM and about 2000 RPM. The tool joint may be made of a first steel alloy selected from AISI 4135, AISI 4137, AISI 4140, AISI 4142, AISI 4145, and AISI 4147. The tool joint may have a temperature between about −20° C. and about 50° C. The tool joint may contact a stationary pipe made of a second steel alloy selected from AISI 4135, AISI 4137, AISI 4140, AISI 4142, AISI 4145, and AISI 4147. The pipe may have a temperature between about −20° C., and about 50° C. prior to contacting the rotating tool joint. The contact between the tool joint and the pipe may generate heat through mechanical friction, thereby forming a weld region between the rotating tool joint and the stationary pipe having a first temperature. The tool joint may be decelerated to a stationary position after the weld region is formed. The weld region may be cooled from the first temperature to a second temperature through self quenching. The weld region may then be tempered at a third temperature. The weld region may then be cooled from the third temperature to a fourth temperature.

BRIEF DESCRIPTION OF THE DRAWINGS

So that the recited features may be understood in detail, a more particular description, briefly summarized above, may be had by reference to one or more embodiments, some of which are illustrated in the appended drawings. It is to be noted, however, that the appended drawings are only illustrative embodiments, and are, therefore, not to be considered limiting of its scope.

DETAILED DESCRIPTION

Figure 1:
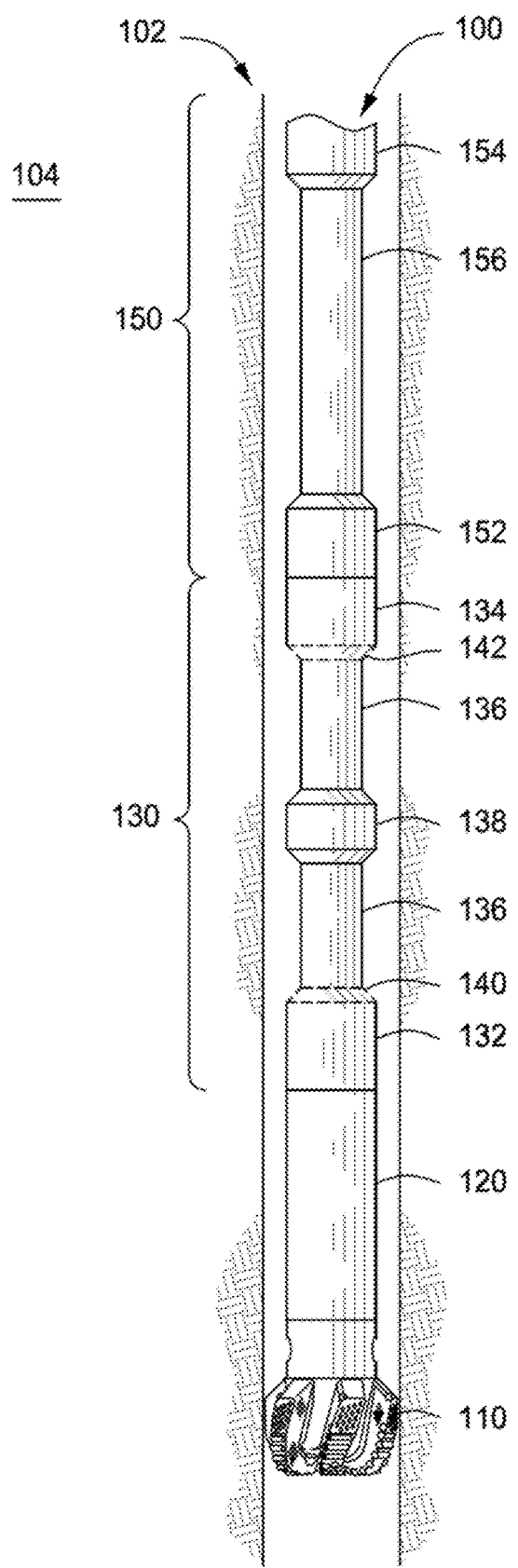
FIG. 1 depicts an illustrative downhole tool, according to one or more embodiments disclosed.

FIG. 1 depicts an illustrative downhole tool 100, according to one or more embodiments. The downhole tool 100 may include a drill bit 110, one or more drill collars 120, one or more heavy weight drill pipes ("HWDP") 130, and one or more "standard" drill pipes 150. The drill bit 110 may be or include a cutting tool for forming or creating a wellbore 102 in a subterranean formation 104.

One or more drill collars (one is shown 120) may be coupled to the drill bit 110. Although one drill collar 120 is shown, it may be appreciated that the downhole tool 100 may include two or more drill collars 120 coupled together in series. The drill collar 120 may be a thick-walled tubular component machined or otherwise formed from a solid bar or block of metal, such as steel. The drill collar 120 may have a mass sufficient to provide the downward force used by the drill bit 110 to drill through the subterranean formation 104. A bore may extend axially through the drill collar 120 such that fluid may be provided through the drill collar 120 to the drill bit 110. The drill collar 120 may have a length ranging from a low of about 1 m, about 2 m, about 4 m, about 6 m, or about 8 m to a high of about 10 m, about 12 m, about 14 m, about 16 m, or more.

One or more heavy weight drill pipes ("HWDPs") 130 may be coupled to the drill collar 120. Although one HWDP 130 is shown, it may be appreciated, that the downhole tool 100 may include two or more HWDPs 130 coupled together in series. The HWDP 130 may include one or more tool joints (two are shown 132, 134) coupled to or integral with a tube or pipe 136. For example, a first tool joint 132 may be positioned at a first or "lower" axial end portion of the HWDP 130, a second tool joint 134 positioned at a second or "upper" axial end portion of the HWDP 130, and the pipe 136 may be positioned between the first and second pipe joints 132, 134. The tool joints 132, 134 may be welded to the pipe 136, as explained in greater detail below.

Each tool joint 132, 134 may have a length ranging from a low of about 0.25 m, about 0.5 m, about 0.75 m, or about 1 m to a high of about 1.25 m, about 1.5 m, about 1.75 m, about 2 m, or more. A bore may extend axially through the tool joints 132, 134 and the pipe 136 of the HWDP 130. The bore through the HWDP 130 may be in fluid communication with the bore through the drill collar 120 such that fluid may be provided through the HWDP 130 and the drill collar 120 to the drill bit 110.

Each tool joint 132, 134 may have art outer diameter ranging from a low of about 10 cm, about 12 cm, or about 14 cm to a high of about 20 cm, about 22 cm, about 24 cm, or more. For example, the outer diameter may be between about 12.0 cm and about 21.6 cm. Each tool joint 132, 134 may have an timer diameter ranging from a low of about 4 cm, about 5 cm, or about 6 cm to a high of about 10 cm, about 12 cm, about 14 cm, or more. For example, the inner diameter may be between about 5.7 cm and about 12.7 cm. Thus, the thickness, (i.e., distance between the inner and outer diameters) of the tool joints 132, 134 may range from a low of about 2 cm, about 2.5 cm, or about 3 cm to a high of about 4 cm, about 5 cm, about 6 cm, or about 7 cm. For example, the thickness may be between about 3.0 cm and about 5.7 cm.

The tool joints 132, 134 may be made of a steel alloy. In at least one embodiment, the tool joints 132, 134 may be made of a chromium molybdenum low alloy steel, such as American Iron and Steel Institute ("AISI") 41XX. For example, the tool joints 132, 134 may be made of AISI 4135, AISI 4137 AISI 4140, AISI 4142, AISI 4145, AISI 4147, or the like. The tool joints 132, 134 may include iron (Fe), carbon (C), manganese (Mn), chromium (Cr), molybdenum (Mo), silicon (Si), phosphorus (P), sulfur (S), vanadium (V), titanium (Ti), and/or niobium (Nb).

The tool joints 132, 134 may have an iron content ranging from a low of about 94 wt %, about 95 wt %, about 95.5 wt %, about 96 wt %, or about 96.5 wt % to a high of about 97 wt %, about 97.5 wt %, about 98 wt %, about 98.5 wt %, about 99 wt %, or more. For example, the iron content may be between about 95 wt % and about 99 wt % or between about 96 wt % and about 98 wt %. The tool joints 132, 134 may have a carbon content ranging from a low of about 0.30 wt %, about 0.33 wt %, about 0.36 wt %, or about 0.39 wt % to a high of about 0.41 wt %, about 0.44 wt %, about 0.47 wt %, about 0.50 wt %, or more. For example, the carbon content may be between about 0.38 wt % and about 0.48 wt % or between about 0.40 wt % and about 0.46 wt %, The tool joints 132, 134 may have a manganese content between about 0.5 wt %, about 0.6 wt %, about 0.7 wt %, or about 0.8 wt % to a high of about 1.0 wt %, about 1.2 wt %, about 1.4 wt %, about 1.6 wt %, or more. For example, the manganese content may be between about 0.75 wt % and about 1.3 wt % or between about 1.0 wt % and about 1.3 wt %. The tool joints 132, 134 may have a chromium content ranging from a low of about 0.5 wt %, about 0.6 wt %, about 0.7 wt %, or about 0.8 wt % to a high of about 1.0 wt %, about 1.2 wt %, about 1.4 wt %, about 1.6 wt %, or more. For example, the chromium content may be between about 0.8 wt % and about 1.3 wt % or between about 1.0 wt % and about 1.3 wt %, The tool joints 132, 134 may have a molybdenum content ranging from a low of about 0.10 wt %, about 0.20 wt %, about 0.25 wt %, or about 0.30 wt % to a high of about 0.35 wt %, about 0.40 wt %, about 0.45 wt %, about 0.50 wt %, or more. For example, the molybdenum content may be between about 0.15 wt % and about 0.45 wt %, or between about 0.25 wt % and about 0.45 wt %. The tool joints 132, 134 may have a silicon content ranging from a low of about 0.10 wt %, about 0.20 wt %, about 0.25 wt %, or about 0.30 wt % to a high of about 0.35 wt%, about 0.40 wt %, about 0.45 wt %, about 0.50 wt %, or more. For example, the silicon content may be between about 0.10 wt % and about 0.40 wt % or between about 0.15 wt % and about 0.35 wt %. The tool joints 132, 134 may have a phosphorus content less than about 0.040 wt %, about 0.030 wt %, about 0.020 wt %, or about 0.010 wt %, For example, the phosphorus content may be less than about 0.035 wt % or less than about 0.015 wt %. The tool joints 132, 134 may have a sulfur content. less than about 0.050 wt %, about 0.040 wt %, about 0.030 wt %, about 0.020 wt %, about 0.010 wt %, or about 0.005 wt %. For example, the sulfur content may be less than about 0.040 wt % or less than about 0.010 wt %. The tool joints 132, 134 may have a (combined) vanadium, titanium, and/or niobium content ranging from a low of about 0.005 wt %, about 0.010 wt %, about 0.020 wt %, or about 0.030 wt % to a high of about 0.040 wt %, about 0.050 wt %, about 0.060 wt %, about 0.070 wt %, or more. For example, the vanadium, titanium, and/or niobium content may be between about 0.010 wt % and about 0.060 wt % or between about 0.020 wt % and about 0.050 wt %.

The tool joints 132, 134 may have a tensile strength ranging from a low of about 700 MPa, about 750 MPa, about 800 MPa, or about 850 MPa to a high of about 1,000 MPa, about 1,100 MPa, about 1,200 MN, about 1,300 MPa, or more. For example, the tensile strength may be between about 800 MPa and about 1,100 MPa or between about 900 MPa and about 1,050 MPa. The tool joints 132, 134 may have a yield strength ranging from a low of about 550 MPa, about 600 MPa, about 650 MPa, or about 700 MPa to a high of about 900 MPa, about 950 MPa, about 1,000 MPa, about 1,100 MPa, or more. For example, the yield, strength may be between about 690 MPa and about 970 MN or between about 750 MPa and about 900 MPa. The tool joints 132, 134 may have a Charpy V-notch impact ranging from a low of about 40 J, about 50 J, about 60 J, or about 70 J to a high of about 90 J, about 100 J, about 110 J, about 120 J, or more. For example, the Charpy V-notch impact may be between about 40 J and about 110 J or between about 50 J and about 100 J. Tensile testing and Charpy V-notch impact testing are determined per ASTM A370.

The pipe 136 may have a length ranging from a low of about 1 m, about 2 m, about 3 m, or about 4 m to a high of about 6 m, about 8 m, about 10 m, about 12 m, or more. For example, the pipe 136 may have a length between about 7 m and about 9 m. The pipe 136 may have an outer diameter ranging from a low of about 6 cm, about 8 cm, or about 10 cm to a high of about 14 cm, about 16 cm, about 18 cm, or more. For example. the outer diameter may be between about 8.9 cm and about 16.8 cm. The pipe 136 may have an inner diameter ranging from a low of about 4 cm, about 5 cm, or about 6 cm to a high of about 10 cm, about 12 cm, about 14 cm, or more. For example, the inner diameter may be between about 5.2 cm and about 12.7 cm. Thus, the radial thickness, (i.e., distance between the inner and outer diameters) of the pipe 136 may range from a low of about 1 cm, about 1.5 cm, or about 2 cm to a high of about 3 cm, about 4 cm, or about 5 cm. For example, the thickness may be between about 1.6 cm and about 3.3 cm.

The pipe 136 may include an upset 138. The upset 138 may be a region of increased outer diameter. The outer diameter of the upset 138 may range from a low of about 6 cm, about 8 cm, or about 10 cm to a high of about 18 cm, about 20 cm, about 22 cm, or more. For example, the outer diameter may be between about 10.2 cm and about 18.1 cm. In at least one embodiment, the upset 138 may be in a spiral or helical configuration about the pipe 136.

The pipe 136 may be made of a steel alloy. In at least one embodiment, the pipe 136 may be made of a chromium molybdenum low alloy steel, such as American Iron and Steel Institute ("AISI") 41XX. For example, the pipe 136 may be made of AISI 4135, AISI 4137, AISI 4140, AISI 4142, AISI 4145, AISI 4147, or the like. The pipe 136 may include iron (FE), carbon (C), manganese (Mn), chromium (Cr), molybdenum (Mo), silicon (Si), phosphorus (P), sulfur (S), vanadium (V), titanium (Ti), and/or niobium (Nb).

The pipe 136 may have an iron content ranging from a low of about 94 wt %, about 95 about 95.5 wt %, about 96 wt %, or about 06.5 wt % to a high of about 97 wt %, about 97.5 wt %, about 98 wt %, about 98.5 wt %, about 99 wt %, or more. For example, the iron content may be between about 95 wt % and about 99 wt % or between about 96 wt % and about 98 wt %. The pipe 136 may have a carbon content ranging from a low of about 0.30 wt %, about 0.33 wt %, about 0.36 wt %, or about 0.39 wt % to a high of about 0.41 wt %, about 0.44 wt %, about 0.47 wt %, about 0.50 wt %, or more. For example, the carbon content may be between about 0.35 wt % and about 0.44 wt % or between about 0.37 wt % and about 0.42 wt %. The pipe 136 may have a manganese content between about 0.5 wt %, about 0.6 wt %, about 0.7 wt %, or about 0.8 wt % to a high of about 1.0 wt %, about 1.2 wt %, about 1.4 wt %. about 1.6 wt %, or more. For example, the manganese content may be between about 0.70 wt % and about 1.30 wt % or between about 0.70 wt % and about 1.10 wt %. The pipe 136 may have a chromium content ranging from a low of about 0.5 wt %, about 0.6 wt %, about 0.7 wt %, or about 0.8 wt % to a high of about 1.0 wt %, about 1.2 wt %, about 1.4 wt %, about 1.6 wt %, or more. For example, the chromium content may be between about 0.7 wt % and about 1.3 wt % or between about 0.8 wt % and about 1.2 wt %. The pipe 136 may have a molybdenum content ranging from a low of about 0.05 wt %, about 0.10 wt %, about 0.15 wt %, or about 0.20 wt % to a high of about 0.25 wt %, about 0.30 wt %, about 0.35 wt %, about 0.40 wt %, or more. For example, the molybdenum content may be between about 0.10 wt % and about 0.30 wt %, or between about 0.15 wt % and about 0.25 wt %. The pipe 136 may have a silicon content ranging from a low of about 0.10 wt %, about 0.20 wt %, about 0.25 wt %, or about 0.30 wt % to a high of about 0.35 wt %, about 0.40 wt %, about 0.45 wt %, about 0.50 wt %, or more. For example, the silicon content may be between about 0.10 wt % and about 0.40 wt % or between about 0.15 wt % and about 0.35 wt %. The pipe 136 may have a phosphorus content less than about 0.040 wt %, about 0.030 wt %, about 0.020 wt %, or about 0.010 wt %. For example, the phosphorus content may be less than about 0.035 wt % or less than about 0.015 wt %. The pipe 136 may have a sulfur content less than about 0.050 wt %, about 0.040 wt %, about 0.030 wt % about 0.020 wt %, about 0.010 wt %, or about 0.005 wt %. For example, the sulfur content may be less than about 0.040 wt % or less than about 0.010 wt %.

The pipe 136 may have a tensile strength ranging from a low of about 700 MPa, about 750 MPa, about 800 MPa, or about 850 MPa to a high of about 1,100 MPa, about 1,150 MPa, about 1,200 MPa, about 1,300 MPa, or more. For example, the tensile strength may be between about 700 MPa and about 1,200 MPa or between about 950 MPa and about 1,100 MPa. The pipe 136 may have a yield strength ranging from a low of about 550 MPa, about 600 MPa, about 650 MPa, or about 700 MPa to a high of about 1,000 MN, about 1,100 MPa. about 1,200 MPa, about 1,300 MPa, or more. For example, the yield strength may be between about 600 MPa and about 1,000 MPa or between about 830 MPa and about 1,030 MPa. The pipe 136 may have a Charpy V-notch impact ranging from a low of about 40 J, about 50 J, about 60 J, or about 70 J to a high of about 90 J, about 100 J, about 110 J, about 120 J, or more. For example, the Charpy V-notch impact may be between about 40 J and about 110 J or between about 50 J and about 100 J.

The tool joints 132, 134 may be welded to the pipe 136 forming weld areas or weld regions 140, 142. The weld regions 140, 142 may include a transition between the "smaller" outer diameter of the pipe 136 to the "larger" outer diameter of the tool joints 132, 134. The transition may be at an angle between about 10° and about 30° or between about 15° and about 25° with respect to the longitudinal axis through the tool joints 132, 134 and the pipe 136.

The weld regions 140, 142 may have a tensile strength ranging from a low of about 700 MPa, about 750 MPa, about 800 MPa, or about 850 MPa to a high of about 1,000 MPa, about 1,100 MPa, about 1,200 MPa, about 1,300 MPa, or more. For example, the tensile strength may be between about 700 MPa and about 1,070 MPa or between about 860 MPa and about 1,000 MPa. The weld regions 140, 142 may have a yield strength ranging flow a low of about 550 MPa, about 600 MPa, about 650 MPa, or about 700 MPa to a high of about 850 MPa, about 900 MPa, about 950 MPa, about 1,000 MPa, or more. For example, the yield strength may be between about 600 MPa and about 930 MPa or between about 720 MPa and about 870 MPa. The weld regions 140, 142 may have a Charpy V-notch impact ranging from a low of about 30 J, about 35 J, about 40 J, or about 45 J to a high of about 120 J, about 130 J, about 140 J, about 150 J, or more. For example, the Charpy V-notch impact may be between about 35 J and about 150 J or between about 75 J and about 135 J.

One or more standard drill pipes (one is shown 130) may be coupled to the "upper" tool joint 134 of the HWDP 130. Although one standard drill pipe 150 is shown, it may be appreciated that the downhole tool 100 may include two or more standard drill pipes 150 coupled together in series. The standard drill pipe 150 may include one or more tool joints (two are shown 152, 154) coupled to or integral with a tube or pipe 156. For example, a first tool joint 152 may be positioned at as first or "lower" axial end portion of the standard drill pipe 150, a second tool joint 154 positioned at a second or "upper" axial end portion of the standard drill pipe 150, and the pipe 156 may be positioned between the lust and second pipe joints 152, 154.

Each tool joint 152, 154 may have a length ranging from a low of about 0.25 m, about 0.5 m, about 0.75 m, or about 1 m to a high of about 1.25 m, about 1.5 m, about 1.75 m, about 2 m, or more. A bore may extend axially through the tool joint 152, 154 and the pipe 156 of the standard drill pipe 150. The bore through the standard drill pipe 150 may be in fluid communication with the bore through the HWDP 130 and the bore through the drill collar 120 such that fluid may be provided through the standard drill pipe 150, the HWDP 130, and the drill collar 120 to the drill bit 110.

Each tool joint 152, 154 may have an outer diameter ranging from a low of about 6 cm, about 8 cm, or about 10 cm to a high of about 20 cm, about 22 cm, about 24 cm, or more. For example, the outer diameter may be between about 8.6 cm and about 21.6 cm. Each tool joint 152, 154 may have an inner diameter ranging from a low of about 3 cm, about 4 cm, or about 5 cm to a high of about 10 cm, about 12 cm, about 14 cm, or more. For example, the inner diameter may be between about 4.1 cm and about 10.2 cm. Thus, the radial thickness. (i.e., distance between the inner and outer diameters) of the tool joints 152, 154 may range from a low of about 1.5 cm, about 2 cm, or about 2.5 cm to a high of about 4 cm, about 5 cm, about 6 cm, or more. For example, the thickness may be between about 2.1 cm and about 5.4 cm.

The pipe 156 may have a length ranging from a low of about 1 m, about 2 m, about 3 m, or about 4 m to a high of about 6 m, about 8 m, about 10 m, about 12 m, or more. For example, the pipe 156 may have a length between about 7 m and about 9 m. The pipe 156 may have an outer diameter ranging from a low of about 4 cm, about 6 cm, or about 8 cm to a high of about 16 cm, about 18 cm, about 20 cm or more. For example, the outer diameter may be between about 6.0 cm and about 16.8 cm. The pipe 156 may have an inner diameter ranging from a low of about 3 cm, about 4 cm, or about 5 cm to a high of about 10 cm, about 12 cm, about 14 cm, or more. For example, the inner diameter may be between about 4.1 cm and about 10.2 cm, Thus, the thickness, (i.e., distance between the inner and outer diameters) of the pipe 156 may range from a low of about 0.5 cm, about 0.6 cm, or about 0.7 cm to a high of about 1 cm, about 1.25 cm, about 1.5 cm, or more For example, the thickness may be between about 0.69 cm and about 1.3 cm.

Figure 2:
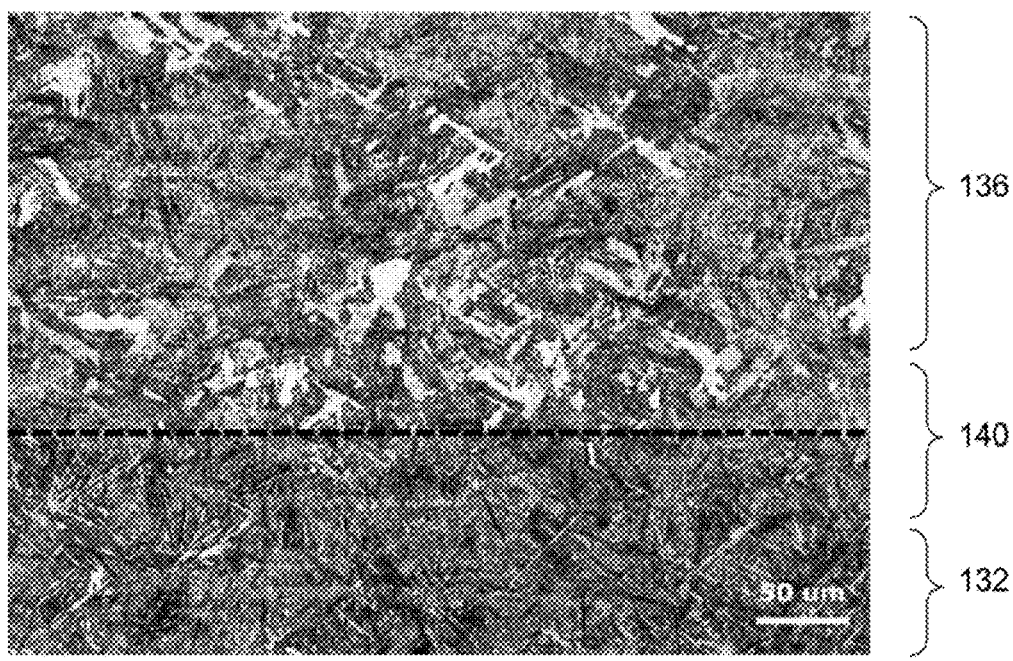
FIG. 2 depicts a photograph taken with an optical microscope of the weld region when the tool joint was preheated to about 343° C. prior to welding, according to one or more embodiments disclosed.

In operation, the HWDP 130 may be formed by welding the tool joints 132, 134 to the pipe 136. In at least one embodiment, the tool joints 132, 134 may be pre-heated prior to being welded to the pipe 136 to a temperature ranging from a low of about 100° C., about 150° C., about 200° C. about 250° C., or about 300° C. to a high of about 400° C., about 450° C. about 500° C., or more. For example, the tool joints 132, 134 may be pre-heated to between about 275° C. and about 400° C. or between about 300° C. and about 375° C. FIG. 2 depicts a photograph taken with an optical microscope of the weld. region 140 when the tool joint 132 was preheated to about 180° C. prior to welding, according to one or more embodiments.

Figure 3:
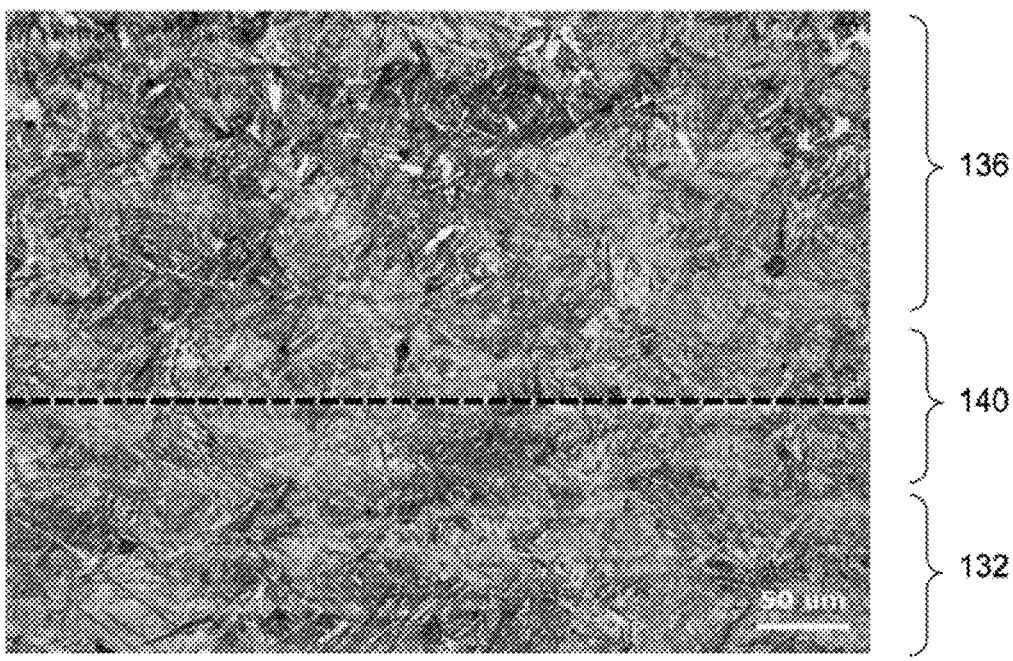
FIG. 3 depicts a photograph taken with an optical microscope of the weld region when the tool joint was not preheated prior to welding, according to one or more embodiments disclosed.

In another embodiment, the tool joints 132, 134 may not be pre-heated prior to the welding process. Rather, the tool joints 132, 134 may be welded at an ambient temperature ranging from a low of about 0° C. about −10° C., about −20° C., or lower to a high of about 30° C., about 40° C., about 50° C., or more. For example, the tool joints 132, 134 may have a temperature between about −20° C. and about 50° C. or between about 10° C. and about 40° C. FIG. 3 depicts a photograph taken with an optical microscope of the weld region 140 when the tool joint 132 was not preheated prior to welding, according to one or more embodiments.

To weld the first tool joint 132 to the pipe 136, the first tool joint 132 and the pipe 136 may be spaced apart (i.e., not in contact with one another, and the pipe 136 may be stationary. The first tool joint 132 may be rotated about its longitudinal axis at a rate ranging from a low of about 500 RPM, about 750 RPM, about 1,000 RPM, about 1,200 RPM, or about 1,400 RPM to a high of about 1,600 RPM, about 1,800 RPM, about 2,000 RPM, or more. For example, the rate of rotation may be between about 1,000 RPM and about 1,500 RMP, about 1,500 RPM and about 1,900 RPM, or between about 1,600 RPM and about 1,800 RPM. While the first tool joint 132 is rotating, it may be moved into contact with the stationary pipe 136.

The contact between the rotating first tool joint 132 and the stationary pipe 136 generates heat through mechanical friction. The heat and force may forge or weld the first tool joint 132 and the pipe 136 together at the weld region 140. This process is oftentimes referred to as friction welding, direct drive friction welding, rotational welding, or inertia welding. Friction welding may include direct drive friction welding, rotational welding, and/or inertia welding. In at least one embodiment, the temperature ("first temperature") in the weld region 140 generated during the welding may range from a low of about 700° C., about 800° C., about 900° C., or about 1,000° C. to a high of about 1,100° C., about 1,200° C. about 1,300° C., about 1,400° C., about 1,500° C. or more. For example, the first temperature may be between about 975° C. and about 1,400° C. or between about 1,040° C. and about 1,150° C.

Once the first temperature is obtained, the firm tool joint 132 may be rapidly decelerated to a stationary position, while maintaining contact with the pipe 136. For example, the first tool joint 132 may be decelerated to a stationary position in less than about 20 seconds, about 15 seconds, about 12 seconds, about 9 seconds, about 6 seconds, or about 3 seconds. Once the first tool joint 132 and the pipe 136 are both stationary and in contact with one another via the weld region 140, the weld region 140 may cool in the presence of the ambient air having a temperature ranging from a low of about 0° C., about −10° C., about −2.0° C. or lower to a high of about 30° C., about 40° C., about 50° C., or more. For example, the temperature may be between about 0° C. and about 50° C. or between about 10° C. and about 40° C.

most The first tool joint 132 and pipe 136 may be relatively "cold" with respect to the "hot" weld region 140. As such, the first tool joint 132 and pipe 136 may provide a sufficiently large heat sink to quench the "hot" weld region 140 by heat conduction at a rate fast enough to allow martensite to form at the weld region 140. This cooling process is referred to as "self quenching." Self quenching does not use pressurized air, water, brine, oil, or the like to cool the weld region 140, as is done in a "forced quenching" process. The weld region 140 may be self quenched until it reaches a "second temperature." The second temperature may be less than about 400° C., less than about 350° C., less than about 300° C. less than about 250° C. less than about 20020 C., less than about 150° C., or less than about 100° C. For example, the weld, region 140 may be self quenched until its temperature is less than about 225° C. or less than about 175° C.

The weld region 140 may then be tempered (i.e., reheated) at a "third temperature" that is below the critical temperature (also known as the transformation temperature) of the weld region 140 In at least one embodiment, the weld region 140 may be tempered at a third temperature ranging from a low of about 400° C., about 450° C., about 500° C., about 550° C., about 600° C. or about 650° C. to a high of about 700° C., about 750° C. about 800° C., about 850° C., about 900° C., or more For example, the third temperature may be between about 550° C. and about 750° C. or between about 650° C. and about 730° C. Tempering time may vary from a low of about 1 minute, about 2 minutes, about 5 minutes, or about 10 minutes to a high of about 20 minutes, about 30 minutes, about 45 minutes, about an hour, or more depending on the third temperature. Tempering may be achieved through the use of a heater, such as an induction heater. Tempering the weld region 140 may allow the weld region 140 to achieve greater toughness and ductility.

Once tempering of the weld region 140 ends, the weld region 140 may cool to a fourth temperature in the presence of the ambient air. Alter the first tool joint 132 has been welded to the pipe 136, the process may be repeated for the second tool joint 134 proximate the other axial end portion of the pipe 136. While the above method has been recited with the first or second tool joint 132, 134 rotating and the pipe 136 held stationary, one or more alternative embodiments may have the pipe 136 rotating and the first or second tool joint 132, 134 held stationary.

As used herein, the terms "inner" and "outer", "up" and "down"; "upper" and "lower"; "upward" and "downward"; "above" and "below', "inward" and "outward":: and other like terms as used herein refer to relative positions to one another and are not intended to denote a particular direction or spatial orientation. The terms "couple," "coupled," "connect," "connection," "connected," "in connection with," and "connecting" refer to in direct connection with" or "in connection with via another element or member," The terms "hot" and "cold" refer to relative temperatures to one another.

Although only a few example embodiments have been described in detail above, those skilled in the art will readily appreciate that many modifications are possible in the example embodiments without materially departing from "Friction Welded Heavy Weight Drill Pipes." Accordingly, all such modifications are intended to be included within the scope of this disclosure. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures, it is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for forming a drill pipe useful for providing a transition between a drill collar and standard drill pipe, comprising:
   rotating a tool joint made of a first steel alloy selected from the group consisting of AISI 4140, AISI 4142, AISI 4145, and AISI 4147, and wherein the rotating tool joint is at or below an ambient temperature;
   contacting the rotating tool joint with a stationary pipe made of a different steel alloy selected from the group consisting of AISI 4135, AISI 4137, AISI 4140, AISI 4142, AISI 4145, and AISI 4147, wherein the pipe is at or below the ambient temperature prior to contacting the rotating tool joint, and wherein the contact between the tool joint and the pipe generates heat and forms a weld region between the rotating tool joint and the stationary pipe having a first temperature between about 975° C. and about 1,400° C.;
   decelerating the tool joint to a stationary position after the weld region is formed; and
   heat treating the weld region, wherein heat treating the weld region consists essentially of:
      cooling the weld region from the first temperature to a second temperature less than about 250° C. through self quenching;
      heating the weld region from the second temperature to a third temperature between 550° C. and 750° C., and maintaining the weld region at the third temperature for between two minutes and ten minutes; and
      cooling the weld region from the third temperature to a fourth temperature between 0° C. and 50° C.

2. The method of claim 1, wherein the tool joint is a first tool joint and the weld region is a first weld region, and the method further comprises, after cooling the weld region from the third temperature to the fourth temperature, repeating the acts of rotating, contacting, decelerating, and heat treating with a second tool joint and a second weld region between the second tool joint and the pipe.

3. The method of claim 1, wherein heat treating the weld region does not include any forced quenching.

4. Them method of claim 1, wherein
   the tool joint has a thickness of between about 3.0 cm and about 5.7 cm and the stationary pipe has a thickness between about 1.5 cm and about 3.0 cm.

5. The method of claim 4, wherein cooling the weld region from the third temperature to the fourth temperature is performed in ambient air.

6. The method of claim 4, wherein the tool joint and the stationary pipe each have a temperature between about −20° C. and about 50° C. prior to contacting each other and forming the weld region.

7. The method of claim 1, wherein
   rotating the tool joint includes rotating the tool joint between about 1,000 RPM and about 2,000 RPM.

* * * * *